US005860020A

United States Patent [19]
Van Venrooy et al.

[11] Patent Number: 5,860,020
[45] Date of Patent: Jan. 12, 1999

[54] OPERATING SYSTEM FOR REAL-TIME HYBRID ENVIRONMENT

[75] Inventors: Roland T. H. Van Venrooy; Petrus M. A. Van Tooren, both of Eindhoven, Netherlands

[73] Assignee: Mannesmann Vdo AG, Frankfurt, Germany

[21] Appl. No.: 622,545

[22] Filed: Mar. 25, 1996

Related U.S. Application Data

[62] Division of Ser. No. 386,605, Feb. 10, 1995, Pat. No. 5,652,911, which is a continuation of Ser. No. 868,747, Apr. 14, 1992, abandoned.

[30] Foreign Application Priority Data

May 22, 1991 [EP] European Pat. Off. .............. 91201224

[51] Int. Cl.⁶ ...................................................... G06F 13/00
[52] U.S. Cl. ................ 395/800.28; 395/680; 395/200.31
[58] Field of Search .............................. 395/820, 200.31, 395/680, 800.28

[56] References Cited

U.S. PATENT DOCUMENTS

| | | | |
|---|---|---|---|
| 4,694,396 | 9/1987 | Weisshaar et al. | 395/200.3 |
| 4,819,159 | 4/1989 | Shipley et al. | 364/200 |
| 4,901,231 | 2/1990 | Bishop et al. | 364/200 |
| 4,954,959 | 9/1990 | Moroto et al. | 364/443 |
| 4,962,458 | 10/1990 | Verstraete | 364/443 |
| 5,073,693 | 12/1991 | McMillan et al. | 342/457 |
| 5,093,669 | 3/1992 | Kajiyama | 342/457 |
| 5,109,344 | 4/1992 | Kakihara et al. | 364/449 |
| 5,128,874 | 7/1992 | Bhana et al. | 364/461 |
| 5,157,614 | 10/1992 | Kashiwazaki et al. | 364/443 |
| 5,159,556 | 10/1992 | Schorter | 364/449 |
| 5,165,018 | 11/1992 | Simor | 395/300 |
| 5,177,685 | 1/1993 | Davis et al. | 364/443 |
| 5,184,303 | 2/1993 | Link | 264/449 |
| 5,287,537 | 2/1994 | Newmank et al. | 395/800.29 |

OTHER PUBLICATIONS

Blake et al., Experimental Evaluation of a Real–Time Scheduler for a Multiprocessor System, IEEE Transactions of Software Engineering, vol. 17, No. 1, Jan. 1991, pp. 34–44.

Emrath, Xylem: An Operating System for the Cedar Multiprocessor, IEEE Software, vol. 2, No. 4, Jul. 1985, pp. 30–37.

Rammaritham et al., Efficient Scheduling Algorithms for Real–Time Multiprocessor Systems, IEEE Transactions of Parallel and Distributed Systems, vol. 1, No. 2, Apr. 1990, pp. 184–194.

Banahan et al., UNIX: the book, Sigma Technical Press, pp. 14–15, 82–87, 92–93, 96–99, 144–149, 246–255.

Alegiani et al., An In–Vehicle Navigation and Information System Utilizing Defined Software Services, Conf. Record of the Vehicle Navigation & Information Systems, Sep. 1989, New York, NY pp. A3–A8.

Computer Design, Feb. 15, 1988, p. 51.

CD–ROM, Optical Publishing, Microsoft Press, Redmond, WV, 1987.

Preston, Compact Disc–Interactive, A Designer s Overview, Kluwer Publ. 1991.

Standard Microsystems Corporation of Hauppage, NY, USA, Local Area Network Controller, COM 90c26, published in 1988 Components Catelog, pp. 207–222.

Rochkind, Advanced Unix Programming, pp. 263–264.

*Primary Examiner*—Larry D. Donaghue
*Assistant Examiner*—John Follansbee
*Attorney, Agent, or Firm*—Mayer, Brown & Platt

[57] ABSTRACT

A distributed data processing system in a surface vehicle comprises sensors, user I/O, data processing and mass storage of geographical data. By means of a restricted library of system calls or primitives that can only be processed as unitary entities after deterministic transport control while keeping the transfer stateless, the distributed real-time operating system allows coexistent running of a plurality of processes that share localized processing power and/or a device, a sensor, I/O and/or file data.

7 Claims, 6 Drawing Sheets

OPERATING SYSTEM FOR REAL-TIME HYBRID ENVIRONMENT

This is a division of application Ser. No. 08/386,605, filed on Feb. 10, 1995 now U.S. Pat. No. 5,652,411, which is a continuation of Ser. No. 07/868,747, filed on Apr. 14, 1992 now abandoned.

FIELD OF THE INVENTION

The invention relates to distributed data processing in a surface vehicle such as an automobile. Present-day car information systems manage various different data categories that are useful to the operation of the vehicle as a whole, such as:

the internal status of the vehicle independent of its actual position;

information relating to its geographical position and route;

information viz-à-viz the driver and passengers, as manifested by input actions and output representations.

A plethora of partial solutions have been and will be realized for engine and environmental control in the vehicle, storing of accessible geography data, route planning and guiding, road-status signalization, external data communication, in-car entertainment control, telephony, and various others. Several of these could translate in stand-alone devices, but interaction therebetween would raise their usefulness. Two examples would be, first, that a low fuel level could guide the route to deviate along a fuel station not on the prechosen route that would by itself be optimum. Second, an incoming mobile telephone call could deactivate any other audio reproduction. Many others would be feasible for improving user functionality, for better physical functionality of the vehicle, or for enhancing data processing capability. A problem would be present in that various partial solutions are realized by different manufacturers, are in different state or realization, have widely different levels of built-in intelligence, such as a binary safety-belt sensor versus a sophisticated route planner computer, all of which problems being aggravated by lengthening software development time and the scarcity of skilled systems analists.

In consequence, amongst other things, the invention envisages the provision of a distributed real-time computer operating system allowing for some or all of the following number of primary goals:

The systems software of the operating system should allow for easy maintenance. It should be simple, and built-up from only few, small, single-function units.

The software should be portable to different hardware, that could be either more sophisticated or downgraded. In particular the system would allow for two different levels of communication. The first, lower level implies transmitting one or more of a finite set of operators (such as on, off, read status), upon which a target will always react with one or more of a finite set of reactions. On the higher level, the destination exhibits a certain degree of non-deterministic behaviour such as is proper to a node or station that is controlled by a local operating system. In this case, the set of reactions need not be finite. Moreover, the answer could be non-deterministically (as seen by the requesting node) delayed by various tasks or processes to be executed by the target node.

The software should have clearly-defined interfaces between its various constituent software modules and also with regard to present or future application software. In this way any software module might be improved without creating havoc in the remaining part.

A principal element should be an operating system for controlling the respective local facilities, that has a powerful nature and easily accessible structure, such as CD-RTOS (Compact Disc Real Time Operating System), derived by Microware, DES Moines, Iowa, from earlier OS-9, or another system of comparable capabilities. In particular this operating system has been designed in the CD-I-(CD-Interactive) subsystem for containing and presenting optical-disk-stored information pertaining to geography and the like.

The interconnection network should allow for deterministic message traffic, that is under normal circumstances the time lag between transmission and arrival of data should have a prespecifiable worst case maximum, which may of course depend on such global system properties as the number of nodes. As explained hereinafter, the ARCNET standard bus protocol allows advantageous realization. This has been developed by Standard Microsystems Corporation of Hauppage, N.Y., USA, and implemented in Local Area Network Controller COM90 C26, published in their 1988 Components Catalog, pages 207–222.

The interface between the operating system and any application software module should be standardized. In this way, changing the number, nature and performance of the application software modules would not entail change of the control system. Moreover, change of the system hardware would only necessitate changing the system software, but not the application- or node-specific software.

SUMMARY OF THE INVENTION

Accordingly, the invention envisages to allow the software pertaining to the local module being written in C-language, and providing thereto, in addition to assembler means for converting high-level language statements into binary code that directly controls the local hardware and/or database items, a local library for thereby converting various elements of a limited set of primitives to an appropriate format as dictated by the bus protocol. This allows that any change on the bus level (hardware or software) would only necessitate modifying the library, and any change in a first node would only necessitate modifying the accessing facilities of the bus, but never software present in any second nodes. As such limited set, the inventors have seen sufficient (and often necessary) the following ninesome: open, close, read, write, seek, getstat, setstat, signal, create (=create process). These nine have been described as so-called System Calls in a UNIX-environment as a subset of 54 allowable System Calls in M. J. Rochkind, Advanced Unix Programming, Prentice-Hall Inc., Englewood Cliffs, N.Y., USA, 1985. In particular, the getstat/setstat pair are special derivatives from the octl system call which had already been developed in OS-9. The index to the above book lists all system calls as explained hereinafter. For an Arcnet realization, the library need only translate the node-generated entities to the appropriate system call.

According to one of its aspects, the invention realizes its object in that it provides a multinode distributed data processing system in a surface vehicle comprising:

a1. sensing means for sensing physical quantities relating to said vehicle;

a2. storage node means for storing physically partioned and fixed geographical data elements;

a3. data processing node means for processing said physical properties and said geographical data to generate user policy data;

a4. user I/O node means for receiving request data for forwarding to any data processing node to control said processing and for controlled forwarding to a user said user policy data;

a5. user input/output means interfacing said user I/O node means to user signals;

a6. and network means interconnecting said node means, at least one node interfacing to said sensing means; and at least one node executing application software; said system having the following provisions:

b1. a library of messageable system calls or primitives, comprising: open, close, read, write, seek, getstat, setstat, signal, creat;

b2. a deterministic network control system for effecting any network transport of a primitive within a prespecified maximum time interval;

b3. a message processing organization exclusively allowing processing of a message subject to completed transfer thereof as a unitary entity;

b4. a state-maintaining control to keep any discourse between respective nodes over the bus stateless;

b5. a distributed real-time operating system to allow coexistent running of a plurality of respective processes that share localized processing power and/or a device, and/or a sensor, I/O and/or file data.

The physical quantities may, for example, relate to engine temperature, door closure, direction of earth magnetic field, presence of other vehicles, vehicle speed, and many others. Main store may be on one or more nodes, as RAM, disc, tape or other. Supplementing by non-fixed data such as congestion or local thunderstorms may be advantageous, data processing may be feasible on one or more nodes. User I/O may comprise push-buttons, voice I/O, visible display, blocking of certain activators. The network may comprise one or more buses, but point-to-point connections and other organizations could feature as well. Certain nodes could have more than one function among points a2, a3 . . . . The library means that the system allows the generation, reception, and answering of those primitives. The deterministic traffic control system according to the above may be realized in a variety of ways. A very simple way is by allotting to each prospective message source station one time slice in a uniformly revolving sequence. Somewhat more effective is by cyclic prioritizing, so that any source that does not want to send a request is bypassed substantially instantaneously. Also, arbitration among priority numbers is an allowable solution, if there exists some feature to ensure transport facilities for low priority sources, such as raising their priority after a predetermined time. These control systems appear standard knowledge in the art of computer networks.

The unitary character implies that a message will be processed only if its transfer is complete. In the opposite case, any processing operation could be interrupted because intervening collisions on the network or even removal of the origin station of the message would render the input information permanently and possibly, irreparably, incomplete. In the present system, such removal or addition, would not cause malfunctioning in another node.

Furthermore, the discourse between two stations is stateless. This means that during a message-in-transfer the stations will not change their state in respect of that message. The source node will suspend any operation pertaining to the message, and the destination node can only operate in reaction to the unitary message when it has been received completely. The advantage thereof is conspicuous if the message would not fit within a standard bus frame, which could give non-negligeable delay between the transmitting of the first frame and the receiving of the last one.

Through the multiprocessing character of the network, signals received or device outputs constituted can be managed independently and simultaneously. The data file in question may reside in the storage means, or locally in one of the respective processors. Conventionally, the physical properties may relate to temperature, ignition, fuel level, external conditions. The geographical data is record-organized and oriented to a parcel-wise organization of the map. There may be one or more data processors. The storage may be a separate node, or directly attached to a processor. User I/O may be acoustical, LED, CRT on various levels of complexity.

Advantageously, said system allows furthermore interprocess communication on the basis of signals. Also on the level of the processing, this enhances the level of cooperation.

Advantageously, said storage node allows reversible coupling with a mass storage medium. Optical and other mass storage media, preferably in disk form, represent attractive solutions for massive storage requirements.

Advantageously said data processing system is organized as a plural-bus system in that at least one node interfaces to at least two buses of respective different protocols. This allows easy interfacing to present in-car management systems. Generally, any server process has at most one queue.

Advantageously, said data processing system has queue management with respect to any server process allowing prespecifying of maximum access depth in that server process' queue. This allows flexible queue management.

Advantageously, said data processing system has a server allocation mechanism for automatically detecting a need for creating a new server process. This smoothly solves any competition between respective user processes.

Advantageously, said data processing system has a first memory node and mapping means for locally mapping at a second node that is different from said first memory node at least a fraction the memory at said first memory node. This allows for easy storage access.

The invention also relates to a data processing system for use as a multinode distributed data processing system according to the foregoing. The system may consist of the data processing proper, i.e. hardware and software, but without specific sensing means and user I/O means that are dictated by the vehicle functionality, but not by the data processing proper.

Further advantageous aspects of the invention are recited in dependent Claims.

BRIEF DESCRIPTION OF THE DRAWINGS

The invention will hereinafter be described along a preferred embodiment which is further shown in the following Figures.

DESCRIPTION OF A PREFERRED EMBODIMENT

Figure 1:
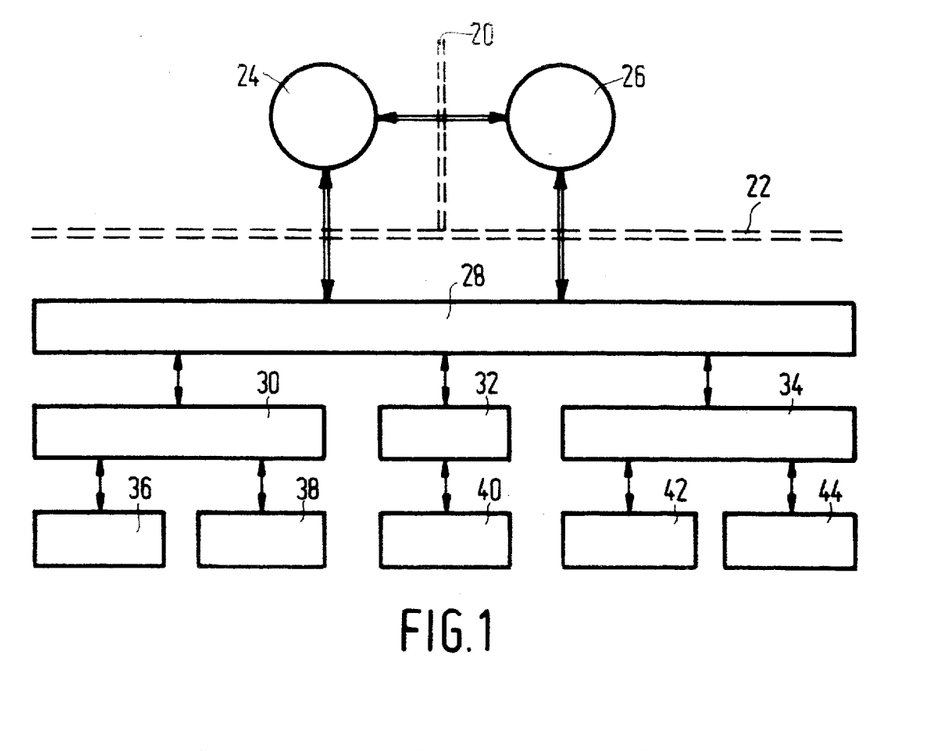
FIG. 1 shows by diagram a distributed data processing system and object oriented application interfaces.

Hereinafter, a preferred embodiment is disclosed, first with respect to general hardware subsystems, and next with respect to its general software subsystems. Thereafter various advantageous features of the invention are highlighted in detail. Now, FIG. 1 shows by diagram a distributed data processing system and the object-oriented application interface according to the invention. For explanation, first the seven layers of the OSI-communication model are briefly reviewed, to wit, the physical, link, network, transport, session, presentation, and application layers, respectively, as follows:

the Physical Layer, which transfers bit streams over the media;

the Data Link Layer, which transfers data between directly connected systems;

the Network Layer, which provides routing and relaying through intermediate systems;

the Transport Layer, which provides transparent, error-free transmission of data between end systems;

the Session Layer, which organizes and synchronizes the dialogue between communicating processes;

the Presentation Layer, which provides for the representation of information in a standardized way; and the Applications Layer, which consists of the interfaces and services closest to the user or an application program and provides the user with actual network services.

All of these layers represent a description of the phenomena actually occurring on the bus or network, but seen from or appropriate organizational level (cf. Computer Design, Feb. 15, 1988, page 511).

Now, according to the present invention, the distributed computer system is not aware of the physical location of the hardware, but accesses all peripherals in the same way. Whether such peripheral be located on the user interface node(s) or on the CD-player makes no difference to those other peripherals on the navigation board.

In FIG. 1, each circle represents user application software that is executed in an associated process. In the Figure two such application software procedures or modules 24, 26 have been shown. Functionally, they may intercommunicate via application interface 20 shown as an interrupted line pair. Horizontal interrupted line pair 22 represents the system interface which interfaces any application process to any system process. Physically, of course, user software modules 24, 26 communicate via the system, in casu, the network or bus facilities. Further rectangles represent system software modules. First, block 28 represents the handling of all requests by and towards the application software modules. Each physically localized station or node that is interfaced to the network has a local operating system 30, 32, 34. Each localized device or module which communicates directly (i.e. not via the network) to one of the local stations has been depicted by respective blocks 36, 38, 40, 42, 44, representing the associated software.

Figure 2:
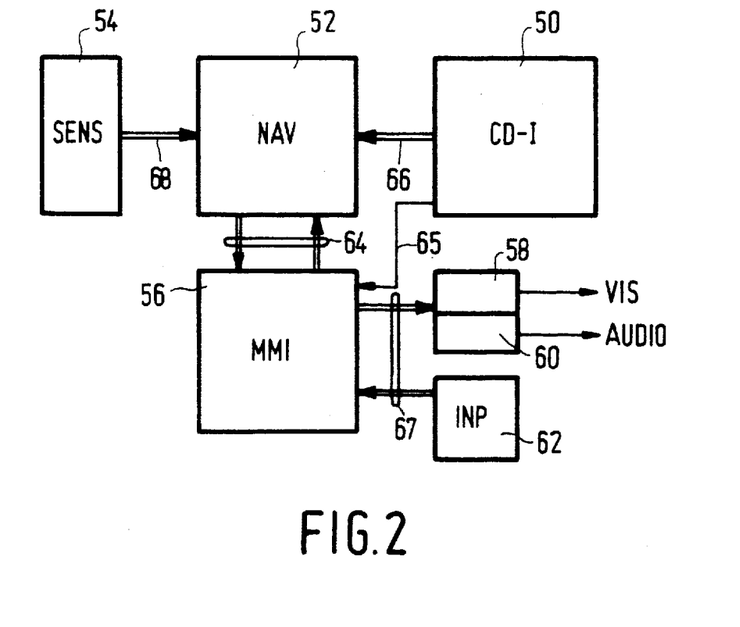
FIG. 2 shows cooperation among modules in a vehicle navigation system.

FIG. 2, as a hardware counterpart to FIG. 1, shows the cooperation amongst physical modules in a vehicle data processing system. There are three principal stations, to wit: block 50 represents a CD-I or CD-ROM player together with its optical record. CD-ROM and similar systems have been widely marketed. CD-I on an optomechanical level is identical thereto; for storing pictures various standards have been defined, such as described in S. Ropiequet et al., CD-ROM, Optical publishing, Microsoft Press, Redmond, Wash., 1987, pages 162/3. Such record may contain geographical and topological map data, program data, entertainment data, data base information, voice data, and other. Block 52 is the so-called navigation computer. It receives, directly or via the network or bus, sensing signals from sensor set 54. This could relate to an absolute or differential compass, odometers coupled to the vehicle wheels, sensors for in-road signal code generators, temperature, fuel level, malfunction signalization, or other. Element 56 is a human-machine interface module. It outputs user policy data on visual display elements 58 and/or audio reproduction element 60. Such policy data may have various character. They may indicate a single policy, and as such may represent advisory, exhortative, directing, warning, or invective information. Alternatively they may represent a choice such as a menu format. Still further, they may represent an invitation to making an open choice, such as by displaying a map with a variety of parking spaces which are open to a vehicle, among which a car driver may make a choice. Furthermore, interface module 56 receives user request inputs from input element 62. Latter may physically be a key, a keyboard, mouse, soft key display, or other appropriate. The user person may input request signals. This could represent a request for accessing a certain map position, an information request, a selector signal, an acknowledge, or other. In certain cases, not shown, the system could have physical driver output for directly controlling the vehicle, such as ignition or lighting control. Under control of the user input signalization, the human-machine interface module may selectively control the representation by elements 58, 60. Also, it may selectively control forwarding of user request signals to navigation computer 52, for example in checking of allowability or feasibility of such request signal. Navigation computer 52 receives user request signals or other signals on line 64, map data on line 66, and sensor data on line 68. It may, under control of actual position of the vehicle and user-inputted destination position or destination indication, plan an optimum route for the vehicle. Optimization may be for minimum travel time, minimum travel distance, or any other criterion. Navigation computer 52 may also control a particular display in various different ways, such as by scaling, rotating of the present image, highlighting map details such as street names or fuel stations. It may insert other information by blanking, windowing or cursoring. It may calculate actions to be followed or present a menu from which a user may select one or more items. Now, the representation in FIG. 2 is largely schematic, in that only the main data streams, such as 64, 65, 66, 67, 68 are shown. As explained infra, these streams may either be point-to-point, or mapped onto one or more buses. Furthermore, certain functions could be mapped on one or more nodes, such as the human interface and the sensors. Alternatively, parts of different functional blocks could be mapped together on a single node. The choice would be open to the developers, in line with available hardware and/or required functionality level.

Now, one of the results of implementing the present invention is, that a standard way for adding (or removing) hardware is offered, in that all hardware devices may be accessed by the application software in a substantially uniform way. For example, if a standard synchronous link were changed into a much faster connection, only the operation speed would improve, but no job would run any differently. Such changing of the system may even be effected during operation (run) of the system, without the operation of any other station than the one or ones directly affected being endangered. Of course, if a first station needs the hardware or software belonging to another station, the taking away of the second station would cause the job in question to be inexecutable, but given the possibility for execution in principle, this execution will be realized. The feature of so accessing facilities across the network is called -resource sharing-. All interprocess communication mechanisms from every process on every node to any other process, whether on the same node or another node, may be used, provided that the communication operations are supported by the local operating systems of the two nodes involved. If yes, the transport mechanisms effectively produce a distributed operating system that is advantageously of a real-time capability. In practice, a user process (representation of a user program) may be forked (or mapped) on a predetermined node, but by means of sending identification information, may access any other process or device. The solution given here is insensitive to the processor type. The local operating systems 30, 32, 34 may be realized by the OS-9/CD-RTOS system cited earlier.

FUNCTIONALITY

The system layer provides a number of general facilities, such as process creation, wherein each process so created may inherit paths and/or environment of the creating process;

inter-process communication by means of signals, semaphores, pipes, streams and packets;

file operations;

a standard CD-I graphics interface;

and, preferably, a shared memory (not shown) in FIG. 2, but known by itself.

In particular, the latter allows to locally map memory that physically is located at another node or allocated to another node. According to the preferred embodiment, the memory is mapped to space that is non-existent. Accessing thereto will generate a bus-error procedure is only supported on such process that allow complete recovery from a bus error state. This solution, although straightforward, is preferably only used in case a local operating system would not allow an alternative solution to the problem for reasons of speed and/or system integrity.

Taken separately, various ones of these facilities may be found on other, known, operating systems, but the combination makes the present system extremely suitable to be used as an operating system gateway.

By way of example, the description hereinafter has been specified for the CD-RTOS operating system. Translation to other operating systems is straightforward. The present invention does not need uniform user interface, which may be defined by the manufacturers of the various user-accessible stations. The invention proposes a control system for inter-station communication, which has its effects on the level of the overall system, but does not influence the particular user interface.

Now, accessing remote resources is done via the same system interface as accessing local resources. The name of the device and the subsequent file specification are the sole means to determine whether an access is a remote access or a local access. Under CD-RTOS the name following the first slash of an identifier expression names the descriptor determining the chosen manager. The scanning of the remainder of the identifier is done by the latter manager. As an example, if the name of any remote service has /c0/_nodeid_/ in front of it, -nodeid- is the number of the node where the resource is located. The indication -c0- is unique to the network the node is connected to. Now, every application program must know the location of every facility it needs. Although some resources are generally available on every node terminal lines, ram_disk etcetera), other facilities are restricted to a particular node. Normally, devices are identified by a logical name which is translated into the real name at the appropriate time. In the case of remote process creation the interface remains also identical to the standard function, but then a separator (slash) must be used and the node identifier (-nodeid-) must be specified. Communication is effected by using the entities -signals-, -files-, -pipes-, and -packages-, as follows. Signals carry elementary event information between processes. The general information character is a two-byte-word. Every process that needs to receive an information signal sets up a signal handler. Files may be opened and accessed on every node by every node. Identification of a file system comprises the residence node identification. Pipes are channels between two or more processes for communicating untyped messages. Packets are used for sharing variables among processes. Every process can link to the packet.

VARIOUS COOPERATIONAL FEATURES

Figure 3:
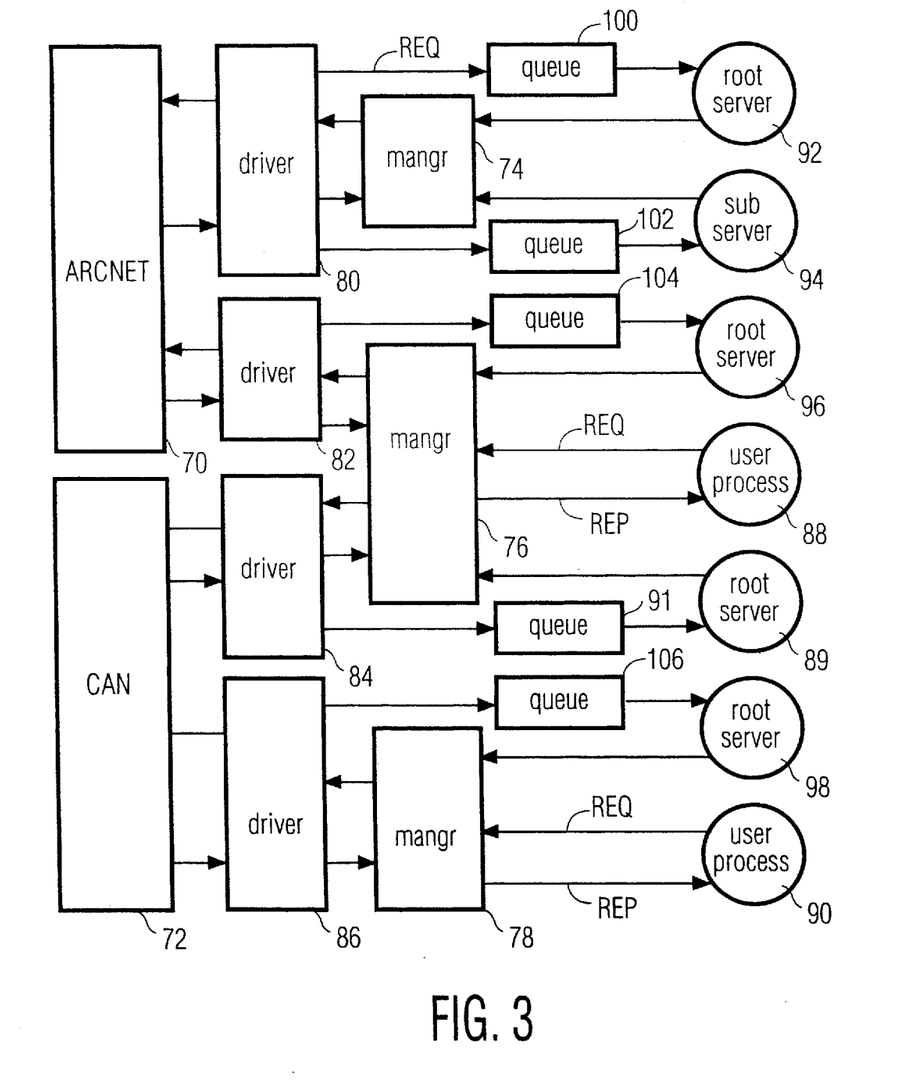
FIG. 3 exemplifies cooperation between various user processes.

FIG. 3 diagrammatically exemplifies cooperation among various processes. For brevity, only the flow of requests and replies has been shown, not the read/write data flows. In this elementary, but representative system, there are two networks, an ARC-net 70 and a Car Area Network 72, both represented as blocks. The Car Area Network (CAN) is principally dedicated to non-navigational information transmitted through the system. The system has three nodes, each node being symbolized by its manager 74, 76, 78 of the processor on the node in question. Each node needs a separate network driver (80, 82, 84, 86) for each network, whereas the middle node is connected to both networks. Furthermore, the system comprises user processes 88, 90 and servers 89, 92, 94, 96, 98. For each network each node has a root server. A user process accesses its local root server. A root server may create and thereafter access sub-servers as necessary. After creation of sub-servers, the user process may subsequently access such sub-server directly via the network. Such sub-server has the data environment of its creator. User process 88 may transmit requests (REQ) to and receive replies (REP) from its local manager 76. The message(s) formatted in so-called CAROS (a mnemonic for CAR-Operating-System) frames are communicated with the appropriate driver (82, 84), which adapts them to the network protocol. When a message is received by a driver (80, 86) at the other end, the latter will know from the content which server queue (91, 100, 102, 106) the information should be sent to. Each server reads from its own queue and executes every command stored therein, each message being restricted to one single command. This means that no further copying from a queue is necessary, inasmuch as it directly precedes the server. If the execution leads to a failure, this is signalled to the originator process. The server signals its result directly to the manager 102 of its node. Request and reply message contain reference information for linking a reply to the request that was its cause originally. The replying manager provides the answer and sends it to the appropriate driver. The driver sends the reply back to the requesting node where the forwarding of data to the user process is handled. The manager is informed by the driver when the transaction is finished and knows when to enable the user process again.

With respect to the above, hereinafter various aspects of a server are described. First, a process may be created on a specified node. The provided system library takes care of locating the specified node, determines if this is local or remote and executes the appropriate system-calls.

If a process is forked on a remote node, enough information is provided to that process to behave as a real child, i.e. having the right paths and environment, being able to determine the process-id(pid) of its parent and returning a pid to the parent that may be used by the parent to send signals to the child.

The process of forking will be explained by the following the different states of the execution of the remote fork system request to the manager.

1: The user process sends a request to the manager to fork a process in a remote node. In the library it has been determined that the process to be forked is indeed requested to run on a remote node, so the manager is called. First action of the library-call is to fork off a local -stand-alone- server which automatically inherits all the paths of the user process, and which will serve to copy the data to and from its paths.

2: The request is sent via ARCNET to the remote node, and serviced. The message sent to the remote node contains all the information necessary to perform an os9exec operation corresponding to a process creation call in that node. The receiving root server first changes it's I/O to reflect that of the original parent process before forking the child. From this moment on, the child runs with inherited I/O and environment.

3: The child exits. When the child process stops running, the local parent is informed by a signal. This specifies when the child was forked. The server reacts by sending a signal to the stand-alone server in the node of the remote parent process, informing it of the termination of the child. The stand-alone server in it's turn, informs the parent and exits. The signal seen by the original parent reflects nodeid and pid of the child. This means that in case of a remote fork only the extended process-id of the child is seen by the requesting process. None of the supporting processes interfere with the original mechanism.

For the implementation of interprocess communication in the server process, for every type of communication a separate message is available.

Signals are handled in a straightforward manner. The message contains the following information: destination process id, signal value and the process id of the sending process. This last information is not strictly necessary, but very convenient as it allows future enhancements and easy debugging. The message may fit in one or more frames that each are subject to a maximum length requirement. If the message does not fit in a single frame, the first frame indicates the length of the message. Otherwise, only the necessary information is sent. The message is sent to the manager, which sends it to the destination node's root server. The server sends it to the specified process.

File I/O forms the basis of most communication mechanisms available. It is divided into three parts:

open a path read, write, and seek operations, wherein -seek- implies setting the file pointer to a specified record close the path.

The -open- call has a message of its own. The message first has to be distributed by the receiving server. A special function called forward_request does this, which is described with respect to FIG. 4.

After the request arrives at the allocated server, the -open- function is executed. The server process is linked with the standard I/O library, thus the returned value is defined. This returned path is combined with the serverid and the nodeid and sent back to the requesting process.

READ AND WRITE

Read, write and seek operations are directed towards a path, that reflects to which node and server the request should be issued. The managers on both the sending and receiving node take care of this. No rerouting of the request is therefore necessary. The request is handled immediately and the bytes are sent back, or written to the file (or device, in which case a new seek address is used).

-Close- is done as follows. If the path exists, the path thereupon is closed. The local path number is deleted from the array in the server, thus creating space for a new path. The array accommodates a standard maximum number of allowed open files. The path number used in the network traffic is an index in this array. Normally only one process at the time can use a particular server.

Pipes, streams and packets are handled in the same way as file I/O. Since servers are claimed by processes, deadlocks on different pipes handled by one single server used by many requesting processes are avoided. These facilities belong to the interprocess communication, but are dealt with here because of their interface.

Figure 4:
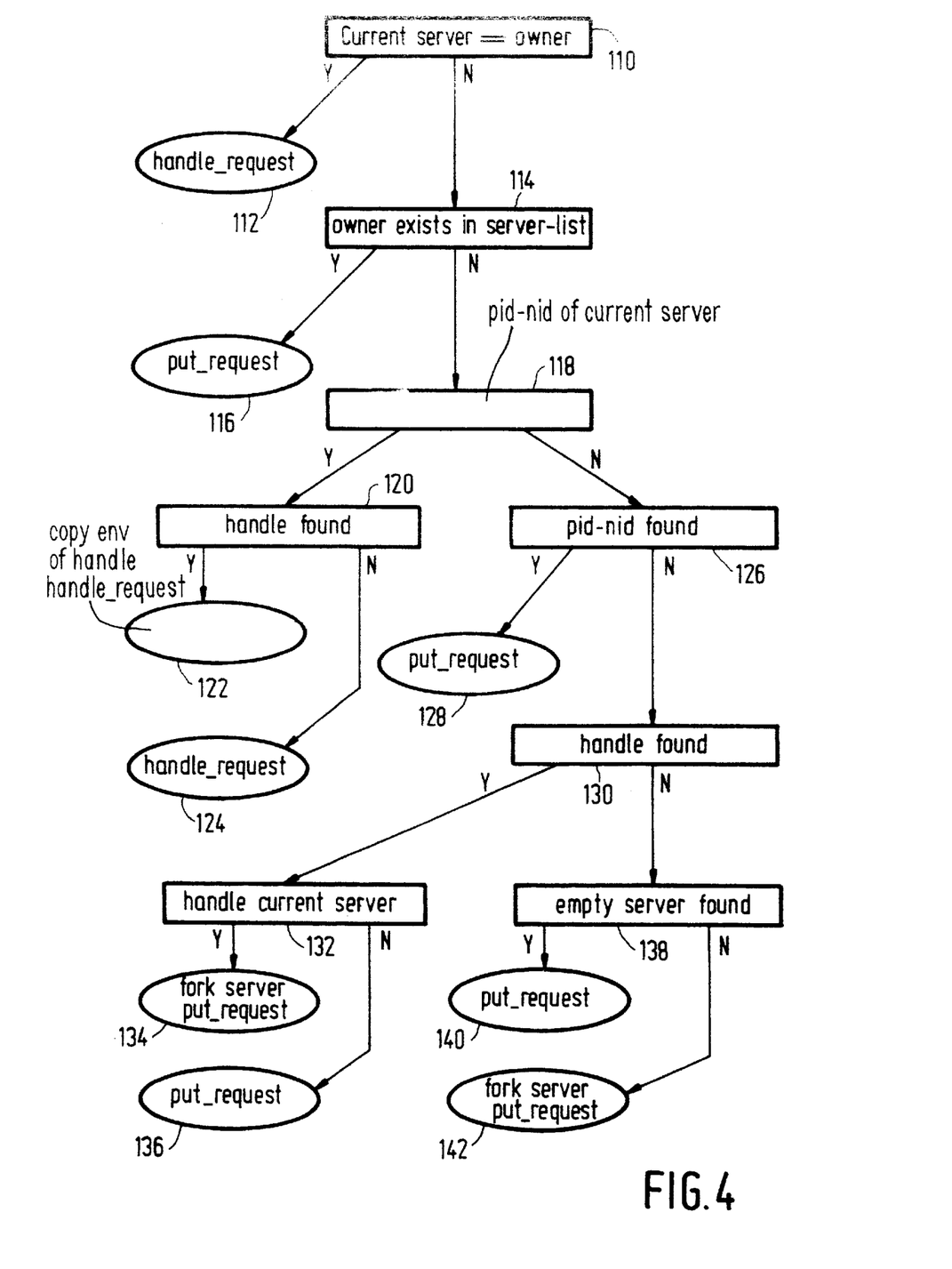
FIG. 4 shows the allocation of server processes.

FIG. 4 diagrammatically shows the allocation of server processes to a request for example a file access request. The first part of such access is open_a_path. This call has a message of its own. It is first distributed by the receiving server. After allocation, the function is executed, then read and/or write are directed to a path which indicates to which node and server the request must be issued. The manager(s) on both transmitting and receiving sides are active here. Finally, the -close- action closes the path if existing. Otherwise, an error signal is returned. Whether or not the action is successful, is effectively determined by the run time library of the local system. Anyway, at closing the path number is deleted in the server. Now, in FIG. 4, the function first checks (110) whether the requesting process is the owner of the server, by checking a special identifier containing the node identifier (nid) and process identifier (pid) of the requesting process and also a server handle, which is a particular environment-determined label, indicating, e.g., a currently selected data directory. The handle also indicates which process is the original owner of a particular data environment. Inter alia, it indicates an external or domestic channel operation (chx/chd) and is used for accessing the server. The information value so acquired is stored in the server description record. If the value is correct, the request can be accommodated (112). If the value is incorrect, various ascending degrees of mismatch may exist. First (114) it is checked in the server list whether there is an owner process to this server. If yes, a request for the server is put into its queue and so kept pending until the server reaches the item in question of the queue (116). If no, it is checked (118) whether the actual process identifier and node identifier refer to the current server. If yes, it is detected whether a handle (120) can be found. If yes, the environment (certain process parameters) are copied and the request is handled (122). If no, the request is handled (124). If, in block 118, the result was negative, it is checked (126) whether process identifier and node identifier correspond to the sender of the request on the server list. If yes, they relate to a different server, and in consequence, the request is allocated: put_request (128). If no, it is checked whether (130) a handle is found. If yes, it is checked, (132) whether the handle relates to the current server. If yes, a new server is created (forked), the child inheriting it's parent environment, and the request is accommodated (134). If no, the request is allocated to the server intended (136). If no handle could be found in block 130, it is checked (138) whether an empty server can be found. If yes, the request is allocated to the server in question (140). If no, the present server is forked (142) and the request is assigned thereto.

If the node identifier and process identifier are correct, but not the handle, this means that a new process has taken over an old slot in which a process ran with an allocated remote server. Then, the server is reallocated to the new process, the server list is scanned for a server with the same handle as the requesting process. If this server is found, its default paths are copied to the current server. The disadvantage is, that a possible child of the previous owner still has a handle of that type, and may try to claim remote access on those default paths, of which the original environment parameters are no longer correct. This risk however, is small. The reverse case (handle correct, but not the identifiers) resembles the first one: first, the server list is scanned for a server with the right process id and node id. If found, control is transferred, as before. If not found, a new server is forked, inheriting the same paths from its parent server. If both the handle and the identifiers are incorrect, this clearly reflects an error condition, since a new-born process will always use handle 0 which is identical to the root server. The handle should therefore always be found. In this case an empty server is allocated if available, otherwise a new server is forked. Generally, client server and requesting user process are on different nodes.

SYSTEM ARBITRAGE FACILITIES

The distributed operating system comprises a library that partly supersedes particular standard C library-calls and comprises several server processes. This library determines from the call whether the service-request should be executed on a remote node in the local area network. If not, the standard C-library call is executed. In case of remote operation the manager builds the necessary packet(s) and passes the pointers to this information to the Arcnet driver that in its turn will send these packet(s) to the remote host.

Figure 5:
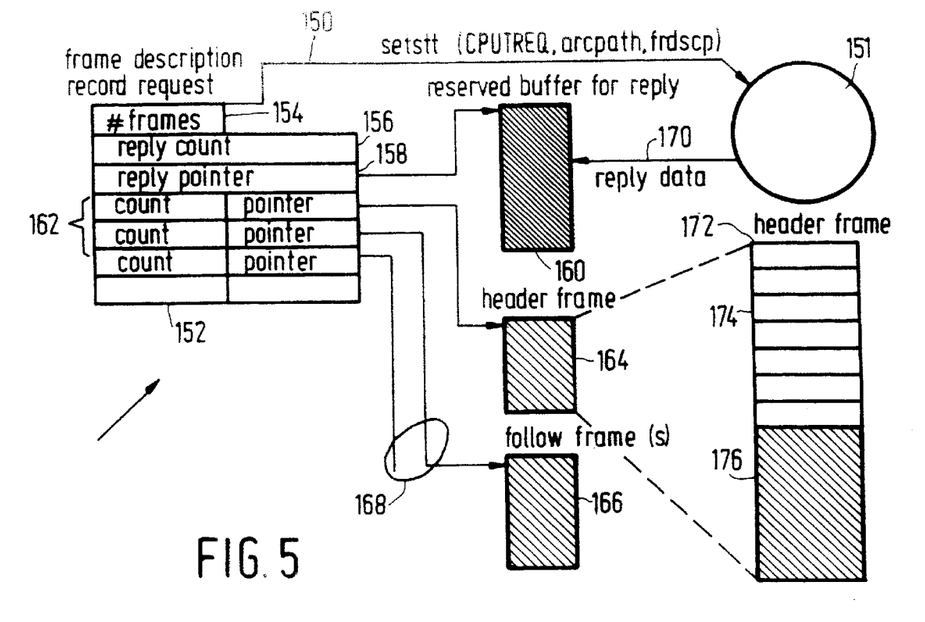
FIG. 5 shows the passing of Arcnet packets.

The Arcnet packets are passed to the manager/driver through a pointer to a table as shown in FIG. 5. The write action is put to sleep until the complete message has been sent; this means that the message is unitary as defined earlier.

Arrow 150 indicates the frame description record request to Arcnet manager 151, while specifying the status setting for handling the request, the path sought, and the frame descriptor pointer. The record comprises a frame number indication 154, a reply count indication 156 that indicates the expected number of reply bytes, a reply pointer 158 pointing to a current address in reply buffer 160, and similar pairs of count and pointer regarding one header frame space 164, zero or more follow frame spaces 166 and, as the case may be, still further spaces accessed symbolically by arrow or arrows 168. Reply data are offered by Arcnet according to arrow 170. The composition of the header frame is shown at 172: first a multi-byte fixed part 174 intended for manager, driver or server, followed by a sequence of individually variable bytes that are exclusively intended for the server. Three kinds of server processes exist:

1. path dedicated server processes (name=descrname+_prc), wherein every process has a dedicated server process allocated. These processes are created by a root server and each consist of a sub-server process with its associated user process' environment.

2. system call dedicated process. The calls involved are remote forks and remote signals. These processes also are created by root servers. Root servers themselves also are of this type.

3. Stand-alone server processes. These work as representing a remote child process. When on the same node as their parent process they inherit the latter's complete environment. In contradistinction thereto, a root server does not have an associated user process' environment, but only a default environment.

The receiving processes (path/system call dedicated) and stand-alone server processes handle queues that are filled by the network. The assignment of one or more frames to a particular message has been described supra: the first frame always signals the length of the message in frames. After the first frame has been sent, further transmitting is not done before the sender receives a xon. In this way signals xon (go-transmitting) and xoff (stop transmitting) straightforwardly control the transfer.

Figure 6:
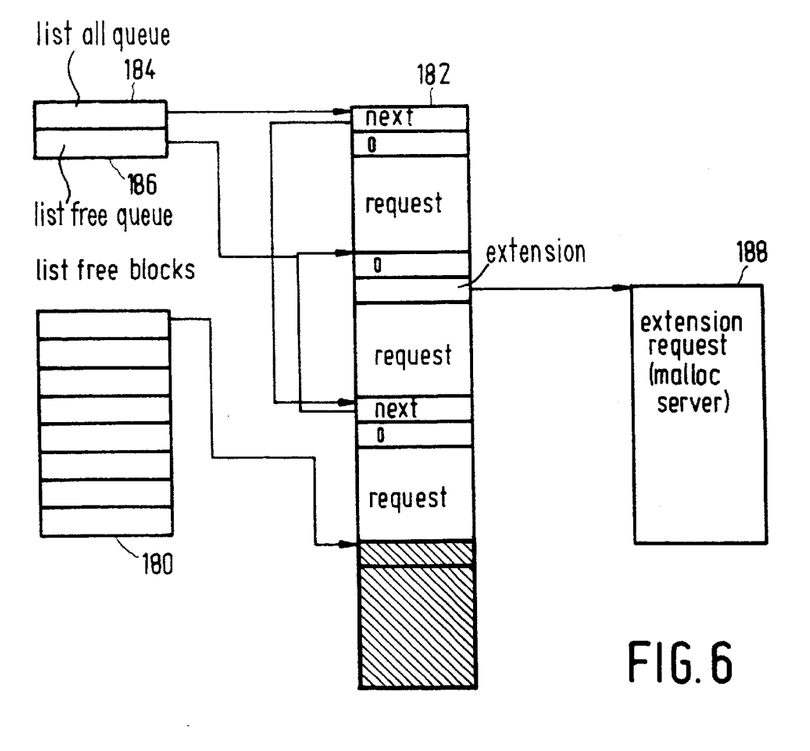
FIG. 6 exemplifies the structure of a local queue.

FIG. 6 exemplifies the structure of a local queue. The queues consist of a memory pool that holds memory blocks of fixed length (36 bytes). A free list array 180 points to the free blocks in memory 182. Furthermore, a register 184 points to the beginning of the queue, while a second register 186 points to the beginning of the free part of the queue. Each element of the queue contains an indication to its successor (nxt) or a -0- if there is none. For IO-requests longer than the standard frame size of 36 bytes the server process executes a memory allocation to extension space 188. Now, queue management is done on two successive levels. First, for small messages (most) a fixed slot size is allocated. If necessary for a particular message, the associated fixed-size slot is linked to one extension slot. The former one is dynamically implicit xoff protocol implemented. Fetching of requests or request units is done on the basis of complete received requests up to a maximum depth in the chain that is expressed in a number of fixed-length slots. In particular, this maintains the deterministic behaviour of the response time for fetching requests out of the queue, and so allows for deterministic message transfer. Second, this allows for accessing various program modules as data files on a distributed level.

Figure 7:
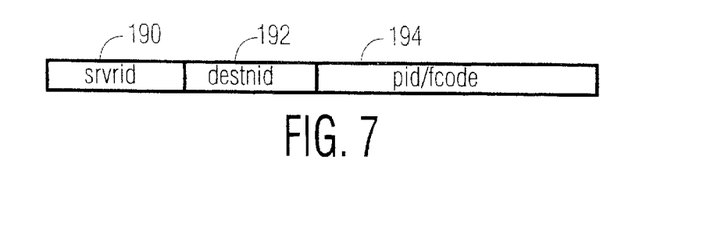
FIG. 7 shows process/path identifier.

The above has been explained for short messages. For any message longer than 36 bytes the sender will wait for a xon from the server process signalling that its malloc (memory allocation) was successful. Then automatically the sender will transfer the extension information. The process/path identifier returned upon a successful creat/open call consists of a long word with 3 distinct fields as shown in FIG. 7: the process identifier of the server process (190), the node identifier of the destination process (192), and the local path/process identifiers (194). The request identifier is dimensioned as a short word. It is only known to the Arcnet driver and passed transparently by the server process. In particular, bit 1 indicates whether the present frame is the last or whether one or more frames are following. Bit 2 indicates whether this is the first frame or whether it is a later frame of a multiframe message. Bits 3, 4 indicate whether it is a request frame, a reply frame, or a control frame. The last 12 bits (of 16) identify a specific request, for example, a link identifier.

QUEUE FUNCTIONS

Hereinafter the elementary queue functions are listed. First the function name is listed. Next it is specified with identifier, operation(s) and parameters, while finally a brief explanation is following:

Creat_queue(nslots)

SRVRQUEP creat_queue(nslots) int nslots;

DESCRIPTION: creates queue with initially "nslots" allocated.

Del_queue(qhdrp)

int del_queue(qhdrp) *qhdrp;

SRVRQUEP qhdrp;

DESCRIPTION: Deletes the queue specified by the pointer passed. Intended for use by server processes when exiting.

Put_queue(srvrid, reqhdrp)

int put_queue(srvrid,reqhdrp)

uchar srvrid;

REQ_HEADER *reqhdrp;

DESCRIPTION: Inserts a record of type REQ_HEADER into the queue, checks if extension is necessary, if so prepares the extension queue to receive it.

Get_queue(frmtp,reqhdrp,depth)

int get_queue(frmtp,reqhdrp,depth)

SRVQUEP frmtp;

REQHDRP *reqhdrp;

int depth;

DESCRIPTION: retrieves request header from queue. Scans only first "depth" queue elements for complete received requests. If get_queue detects a request in the queue of which the request header is received that needs extension space, this will be allocated and a xon will be sent to the source of the request.

Put_subframe(frmtp,reqid,framep,cnt,interleave)

int put_subframe(frmtp,reqid,framep,cnt,interleave)

SRVQUEP frmtp;

short reqid;

unsigned char *framep;

int cnt;

int interleave;

DESCRIPTION: Fills extension space belonging to request identified by "reqid" from given data specified by "framep", "cnt" and "interleave", using a static sequential pointer. This pointer is a part of the global static data of the driver. Interleave describes gap space between 2 consecutive bytes in the buffer holding given data.

FORMAT

Opcodes. Every request has an opcode, referring to a specific operation. Calls. The calls provided by the queue-communication library are listed as follows: put_queue; put_subframe; creat_queue; del_queue; get_queue; creat_reqidtbl; creat_reqid; del_reqid; get_reqid; del_reqidtbl.

Figure 8:
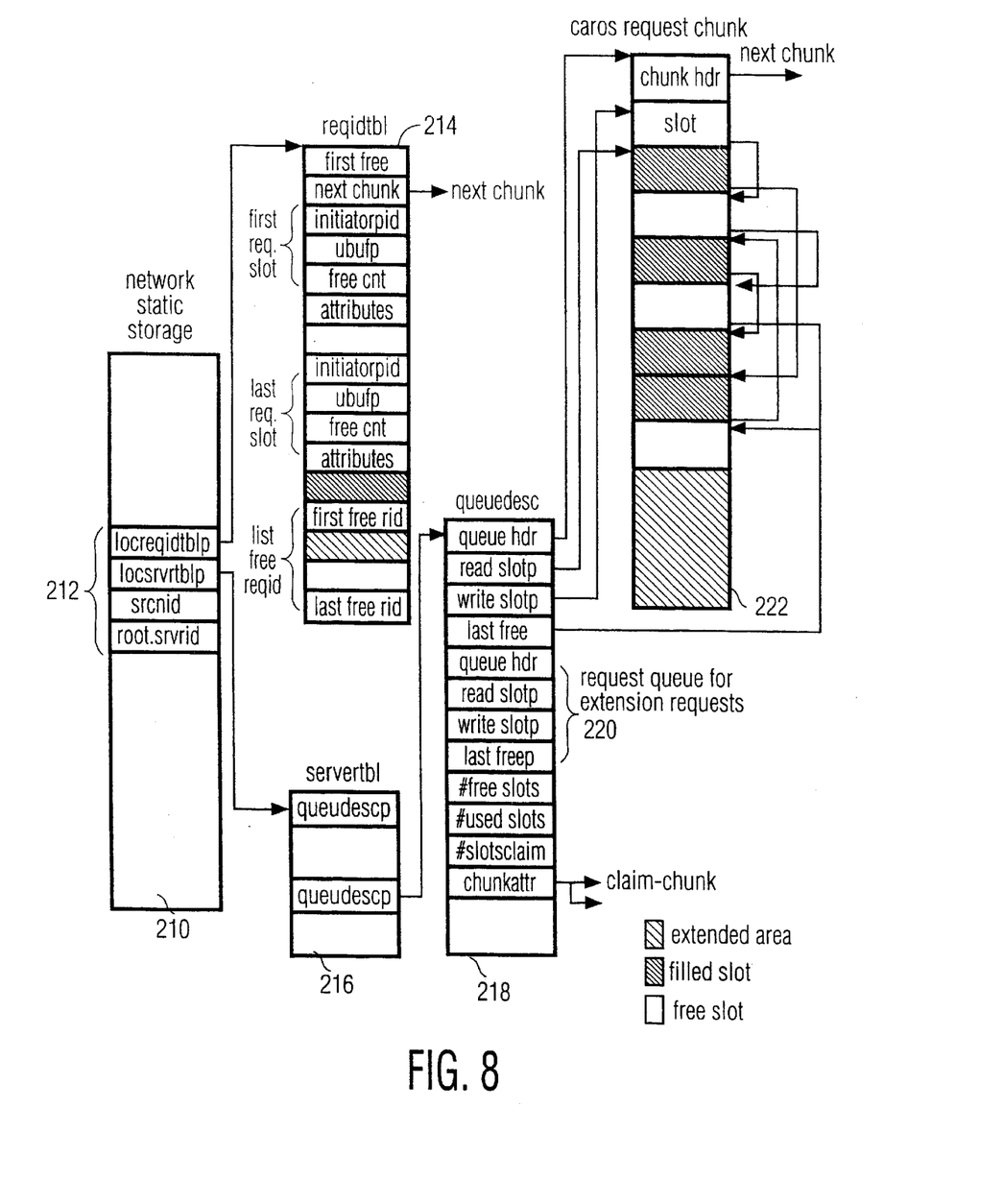
FIG. 8 illustrates instantaneous memory allocation.

Standard header. All requests are accompanied by this information, that is listed as follows: reqid, comprising srcnid, destnid; srvrid; and for the first frame: reqsize. Request id structure sender. The request_id is used differently for sender with respect to receiver, for example—reqid;—reply buffer pointer;—prcid waiting process;— reply count, attributes. Generally, three different kinds of messages exist: request FIG. 8 depicts an instantaneous situation in memory allocation for explaining queue management. The leftmost column 210 gives global static storage on systems level. This static character implies that any process is able to locate the information it needs. In static storage, at item 212 there are stored: locreqidtblp, the address where the request identifier and the table byte length pointer are stored. Furthermore, at 212 locsrvrtblp indicates the address where the server table byte length pointer is stored. Finally, scrnid gives the source node identifier, and rootsrvid the root server identifier. From item 212, respective pointers indicate further regions as shown. In area 214, the request identifier table, reqidtbl, lists the first free chunk, and next, further free chunks that are chained as indicated. Thereafter, the first request slot contains the initiator process identifier, the reply buffer pointer, the count of remaining free locations, and attributes. As shown, this structure proceeds until a last request slot is reached. The attribute field may contain an xon/xoff indicator and a lock/unlock indicator. Furthermore, a table containing a list of free request identifiers, from a first free identifier to a last free identifier is shown. As to the memory usage, lightly hatched means are an extended area, heavily hatched is a filled slot, unhatched is a free slot. Furthermore element 216 is a server table, that indexes on server identifiers in that it stores queue descendent pointers. Element 216 has a pointer to storage area 218 devoted to a queue descendent. Therein, sequentially are stored: the queue header, the read slot pointer, the write slot pointer, the last free pointer, the same repeated for a request queue for extension requests 220 (see FIG. 9), the number of free slots, the number of used slots, the number of slots claimed, and the chunk attribute that may be used to point at claimed chunks. For example, item 222 shows the format of a Caros request chunk. It contains chunk header, a set of linked filled slots indicated by the arrows at right hand, and a set of linked empty slots also linked. Also the pointers to the read slot (start of first filled slot) and write slot (start of first empty slot) and the double pointer to the last free slot are shown.

Figure 9:
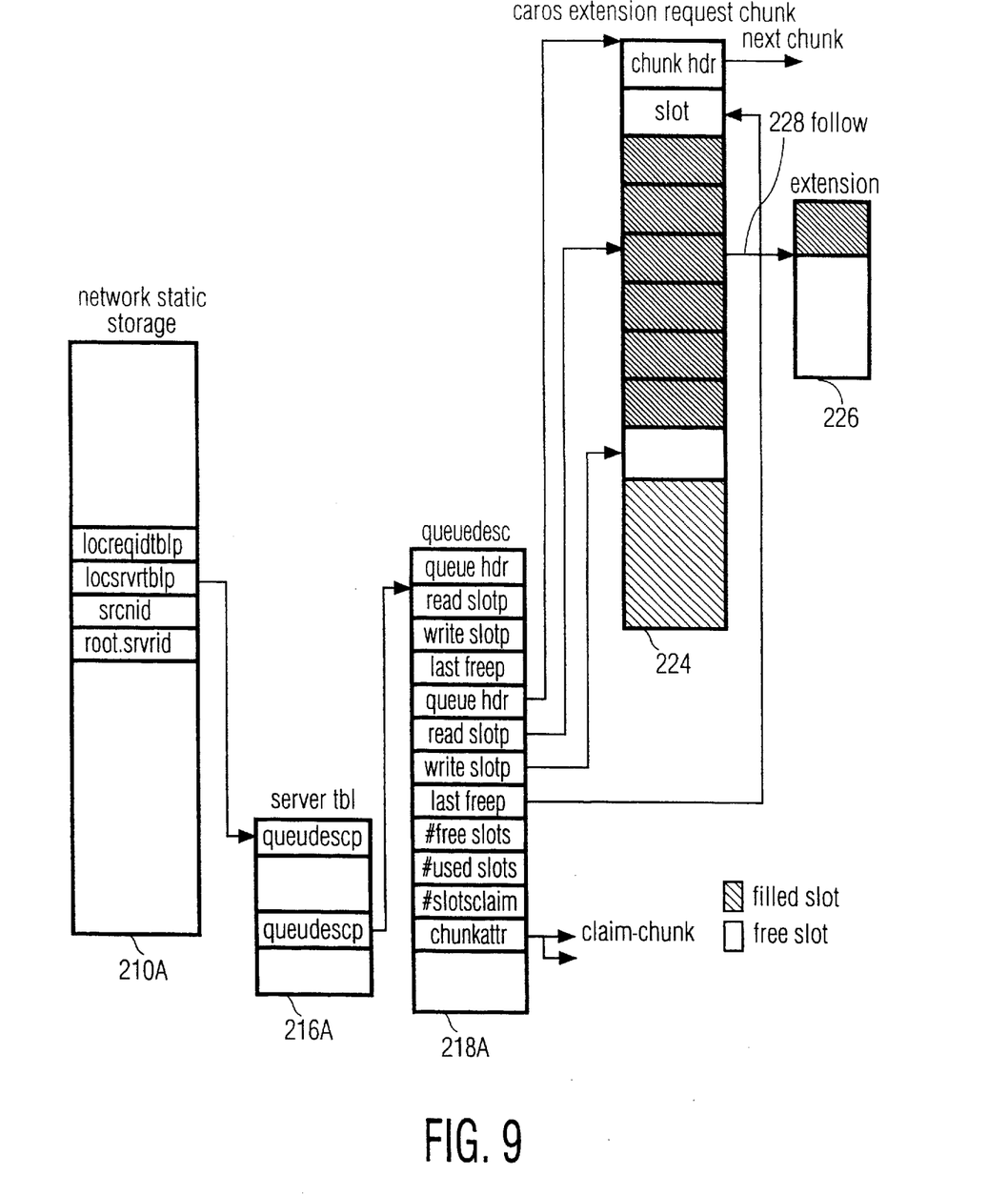
FIG. 9 parallels FIG. 8 for an extension request queue.

FIG. 9 strongly resembles FIG. 8, but in that it relates to a queue for extension requests. Elements 210, 216, 218, 222 of FIG. 8 have their counterpart 210A, 216A, 218A. Block 224 respectively is the caros extension request chunk. It largely resembles block 222, but for extension block 226, that is partly filled (upper) and empty for the remaining part. It is pointed at by pointer 28.

We claim:

1. A distributed data processing system comprising
   a plurality of nodes comprising first and second nodes of distinct types having respective first and second operating systems, respectively,
   the plurality of nodes being adapted to maintain a distributed operating system, which operating system is adapted to superimpose a logical computational structure on the nodes, which logical structure is independent of the presence or absence of particular nodes, so that an application program running within the logical structure can continue to run while at least one of the nodes is being fundamentally altered;

maintain a messaging protocol for communication between the nodes, which messaging protocol requires communication between nodes to be stateless.

2. The system of claim 1 wherein the fundamental alteration comprises adding or removing a node.

3. The system of claim 1 wherein the fundamental alteration comprises changing the respective operating system on a node.

4. The system of claim 1 wherein the first node is a navigation processor for a vehicle;

the second node is a memory interface unit adapted to interface with a memory storing geographical map data;

the application program is a vehicle navigation program.

5. The system of claim 1 wherein the logical structure is adapted to separate sequential code into processes which are executable on different nodes and while sharing resources.

6. The system of claim 5 wherein the operating system is adapted to shift processes from node to node during execution.

7. The system of claim 1 wherein the distributed operating system comprises a deterministic network control system for effecting any network transport of a primitive within a prespecified maximum time interval.

* * * * *